(12) United States Patent
Keskin et al.

(10) Patent No.: US 9,736,567 B2
(45) Date of Patent: Aug. 15, 2017

(54) ELECTRONICS INTERFACE FOR DEVICE HEADSET JACK

(71) Applicant: QUALCOMM Incorporated, San Diego, CA (US)

(72) Inventors: Mustafa Keskin, San Diego, CA (US); James Ian Jaffee, Solana Beach, CA (US); Seyfollah Seyfollahi Bazarjani, San Diego, CA (US); Brett Christopher Walker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 14/499,604

(22) Filed: Sep. 29, 2014

(65) Prior Publication Data

US 2016/0094906 A1    Mar. 31, 2016

(51) Int. Cl.
*H04R 1/10*         (2006.01)
*G06F 13/38*        (2006.01)
(Continued)

(52) U.S. Cl.
CPC ......... *H04R 1/1041* (2013.01); *G06F 13/385* (2013.01); *H04M 1/72527* (2013.01);
(Continued)

(58) Field of Classification Search
CPC .............. H04R 1/1041; H04R 2420/03; H04R 2420/05; H04R 2420/09; H04R 2460/03;
(Continued)

(56) References Cited

U.S. PATENT DOCUMENTS 6,118,384 A * 9/2000 Sheldon .................... G06F 1/24
                                                    324/426
6,203,344 B1 * 3/2001 Ito ......................... H01R 27/00
                                                    439/218

(Continued)

FOREIGN PATENT DOCUMENTS

JP    2001110244 A  *  4/2001
JP    2009110823 A  *  5/2009

OTHER PUBLICATIONS

Kuo, Ye-Sheng, et al., "Hijacking Power and Bandwidth from the Mobile Phone's Audio Interface," ACM DEV'10, Dec. 17-18, 2010, London, UK, 10 pp.

(Continued)

*Primary Examiner* — Leshui Zhang
(74) *Attorney, Agent, or Firm* — Arent Fox LLP

(57) ABSTRACT

A user device determines whether a device connected to its headset jack is an audio accessory device. If the device connected to the headset jack is an audio accessory, the user device connects one or more pins of the headset jack to an audio codec. If the device plugged into the headset jack is not an audio accessory device, the user device connects one or more pins of the headset jack to alternate circuitry. The user device then determines, through the alternate circuitry, an electrical operating parameter requirement of the accessory device, and provides, from the alternate circuitry, the required operating parameter to the accessory device through the headset jack. The alternate circuitry may include an adjustable voltage regulator and/or an adjustable current regulator and the required operating parameter may be one or more of a voltage supply and a current supply.

30 Claims, 4 Drawing Sheets

(51) Int. Cl.
*H04M 1/725* (2006.01)
*H04M 1/60* (2006.01)

(52) U.S. Cl.
CPC ......... *H04M 1/6058* (2013.01); *H04R 1/1033* (2013.01); *H04R 2420/03* (2013.01); *H04R 2420/05* (2013.01); *H04R 2420/09* (2013.01)

(58) Field of Classification Search
CPC H04R 13/66; H04R 13/6608; H04R 2107/00; H04R 2201/06; H04R 24/58; H04R 5/04; H04R 29/00; G06F 13/385; G06F 13/00; G06F 1/26; G06F 19/00; G06F 15/77; H04M 1/72527; H04M 1/6058; H04M 1/6083; H04M 1/02; H04M 1/215; H04M 1/60; H04M 1/725; H04M 3/00; H04M 1/00; H02J 1/10; H02J 7/0055; H02J 7/1423; H01M 2/00; H01M 12/00; H04B 5/00; H04B 1/38; H04B 7/00; H04B 1/40; H04B 1/3877; H02B 1/00; H01R 27/00; H01R 13/66; H01R 13/6608; H01R 2107/00; H01R 2201/06; H01R 24/58; G02B 6/36; G02B 6/38; G01R 19/00
USPC ..... 381/74, 77, 78, 79, 80, 81, 85, 334, 111, 381/123, 302, 86, 314, 315; 455/557–559, 418–420, 90.1, 90.2, 569.2, 455/68, 99, 88; 710/8, 10, 11, 12, 14–19; 700/94; 320/138; 385/88; 439/231
See application file for complete search history.

(56) References Cited

U.S. PATENT DOCUMENTS

| | | | |
|---|---|---|---|
| 6,518,993 B2 | 2/2003 | Kerai et al. | |
| 6,616,300 B1* | 9/2003 | Hrabal .................. | F21L 4/005 320/103 |
| 6,633,932 B1* | 10/2003 | Bork ..................... | G06F 1/266 320/107 |
| 6,985,592 B1* | 1/2006 | Ban ...................... | H04M 1/05 379/308 |
| 7,603,139 B1* | 10/2009 | Tom .................... | H04M 1/0254 455/550.1 |
| 7,812,573 B2* | 10/2010 | Bersenev ............. | H02J 7/0044 320/106 |
| 7,899,946 B2 | 3/2011 | Sherman et al. | |
| 7,928,691 B2* | 4/2011 | Studyvin .............. | H02J 7/0018 307/43 |
| 8,135,443 B2* | 3/2012 | Aleksic ................ | H02J 9/002 320/120 |
| 8,290,171 B1* | 10/2012 | Helfrich ............... | H04R 5/04 381/111 |
| 8,290,537 B2 | 10/2012 | Lee et al. | |
| 2003/0142817 A1* | 7/2003 | Liao ..................... | H02J 7/0054 379/428.01 |
| 2003/0211869 A1* | 11/2003 | Lee ...................... | H04M 1/725 455/572 |
| 2005/0200332 A1* | 9/2005 | Kangas ................ | H02J 7/0073 320/128 |
| 2007/0281756 A1* | 12/2007 | Hyatt ................... | H02J 7/0042 455/573 |
| 2008/0280561 A1* | 11/2008 | Lin ...................... | H04M 1/05 455/41.2 |
| 2009/0058183 A1* | 3/2009 | Morris .................. | H02J 1/10 307/23 |
| 2009/0191914 A1 | 7/2009 | Stahl | |
| 2009/0251003 A1* | 10/2009 | Umemura ............. | H02J 1/10 307/31 |
| 2009/0287067 A1 | 11/2009 | Dorogusker et al. | |
| 2010/0156343 A1* | 6/2010 | Jung ..................... | H02J 5/005 320/108 |
| 2011/0116751 A1* | 5/2011 | Terlizzi ................ | G02B 6/3817 385/88 |
| 2011/0117840 A1* | 5/2011 | Li ........................ | H04M 1/0258 455/41.2 |
| 2013/0142350 A1 | 6/2013 | Larsen et al. | |
| 2013/0158919 A1* | 6/2013 | Shah .................... | H04R 5/04 702/64 |
| 2014/0073250 A1* | 3/2014 | Singh ................... | H04M 1/0258 455/41.2 |
| 2014/0130573 A1 | 5/2014 | Zielinski et al. | |

OTHER PUBLICATIONS

Verma, S., et al., "AudioDAQ: Turning the Mobile Phone's Ubiquitous Headset Port into a Universal Data Acquisition Interface," SenSys'12, Nov. 6-9, 2012, 14 pages.
International Search Report and Written Opinion—PCT/US2015/047989—ISA/EPO—Jan. 21, 2016.

* cited by examiner

ELECTRONICS INTERFACE FOR DEVICE HEADSET JACK

BACKGROUND

Field

The present disclosure relates generally to communication devices, and more particularly to an electronics interface for a device headset jack that switches jack pins to different device circuitry depending on the type of accessory connected to the jack.

Background

The use of the headset jack for applications including audio input, audio output and other accessories is addressed. Accessory devices that provide application such as biometric sensing, environmental sensing, and financial transactions may be connected to any a headset jack such as a standard 4-pin 3.5 mm audio jack. Most of these accessory devices use the open interface of headset jack and the audio coder-decoder (codec) on the chip-set to operate. A disadvantage of such operation arises from limitations, such as output current or output bias-voltages, inherent in the audio codec. To compensate for limitations of the audio codec, these external accessories may require additional circuitry and complexity. For example, if multiple sensors are connected at the same time, more output current/power may be needed than the codec circuit may be able to provide. Or there may be accessory devices which may require output voltage totally different from what codec circuits may be able to source. Or these accessories may require digital input/output signaling.

SUMMARY

In an aspect of the disclosure, a method, a computer program product, and an apparatus are provided. An apparatus, e.g., a user device, determines whether a device connected to its headset jack is an audio accessory device. If the device plugged into the headset jack is an audio accessory, the user device connects one or more pins of the headset jack to an audio codec. If the device connected to the headset jack is not an audio accessory device, the user device connects one or more pins of the headset jack to alternate circuitry. The user device then determines, through the alternate circuitry, an electrical operating parameter requirement of the accessory device, and provides, from the alternate circuitry, the required operating parameter to the accessory device through the headset jack. The alternate circuitry may include an adjustable voltage regulator and/or an adjustable current regulator and the required operating parameter may be one or more of a voltage supply and a current supply.

DETAILED DESCRIPTION

Figure 1:
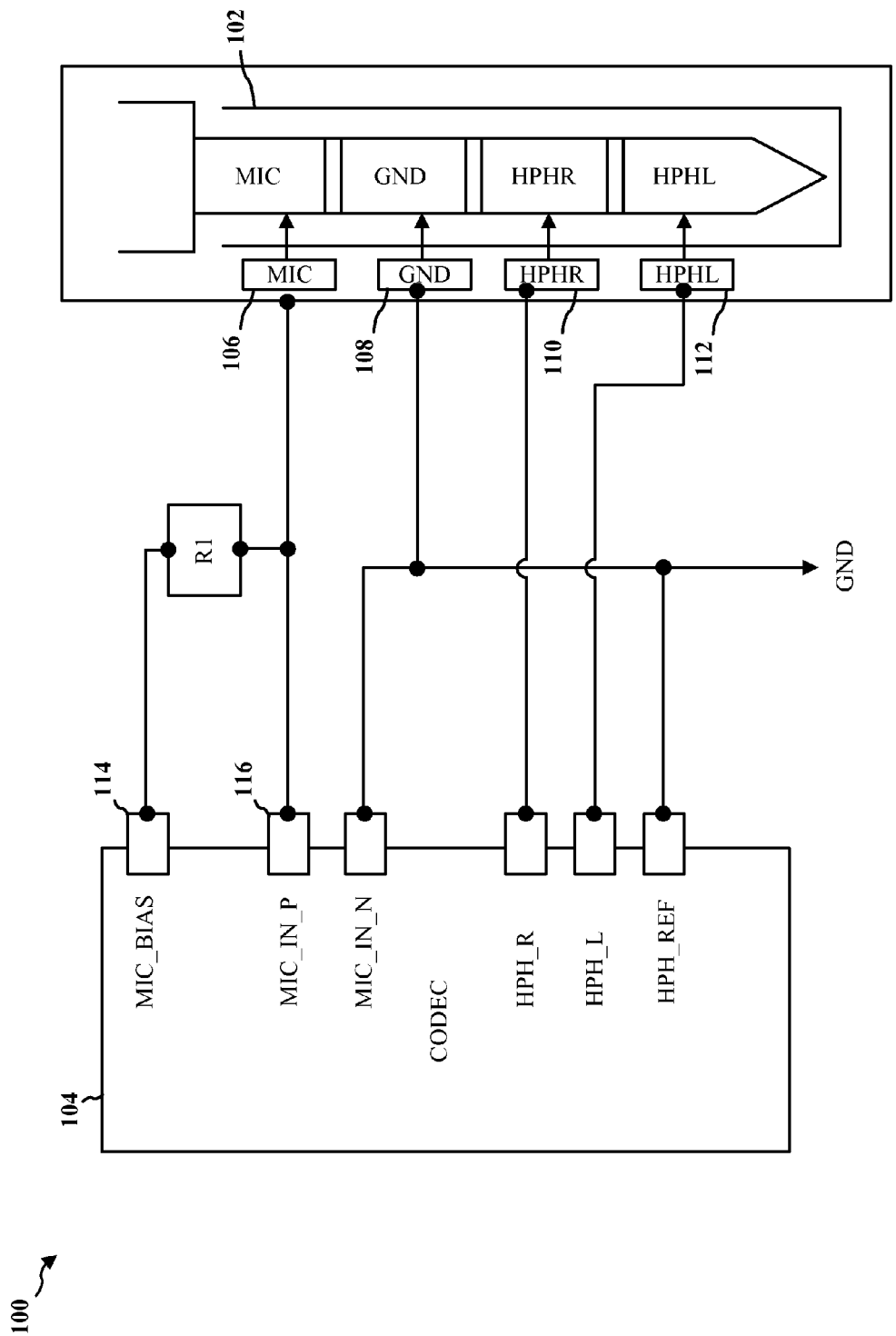
FIG. 1 is a schematic block diagram of a user device having a standard interface between a headset jack and an audio coder-decoder (codec).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of providing an electronics interface for a device headset jack are presented below with reference to various apparatuses and methods. These apparatuses and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, filmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

FIG. 1 is a schematic block diagram of a user device 100 having a standard interface between a headset jack 102 and an audio coder-decoder (codec) 104 integrated chip (IC). The codec 104 functions to provide audio capture and playback. The codec 104 may include a digital signal processor (DSP) and an analog-to-digital (ADC) and digital-to-analog (DAC) converters.

The headset jack 102 is typically used for an audio accessory device, such as a headset/phone or earpiece/bud. In one standard configuration the headset jack 102 has four pin connections. The microphone-in (MIC) pin 106 is an analog input to the codec 104 and functions to provide voice sampling. The ground (GND) pin 108 is common analog ground for input and output pins from the codec 104. The headphone-right (HPHR) pin 110 and the headphone-left (HPHL) pin 112 are analog outputs from the codec 104 and function to provide audio playback.

Recently, the headset jack 102 and codec 104 have been used for purposes other than audio sampling and playback. For example, the headset jack 102 and codec 104 may be used for biometric sensing (http://www.valencell.com), environmental sensing (http://www.mylapka.com), and financial transactions (see http://www.squareup.com). In some of these applications, a microphone bias 114 of the codec 104 provides a fixed current or fixed voltage supply to the connected sensor through the MIC pin 106. Signals from the connected non-audio accessory device may be input to the codec 104 through the MIC_IN_P 116 and digitized by a CODEC-capture path (MIC-ADC), which is normally part of an analog-front-end module of the codec 104.

As described above, the use of the headset jack for applications other than audio input and output is increasing. Accessory devices that provide applications such as biometric sensing, environmental sensing, and financial transactions may be connected to a headset jack. Most of these accessory devices use the open interface of headset jack and the audio coder-decoder (codec) on the chip-set to operate. A disadvantage of such operation arises from limitations, such as output current or fixed output bias-voltages, inherent in current usage of these interfaces.

Figure 2:
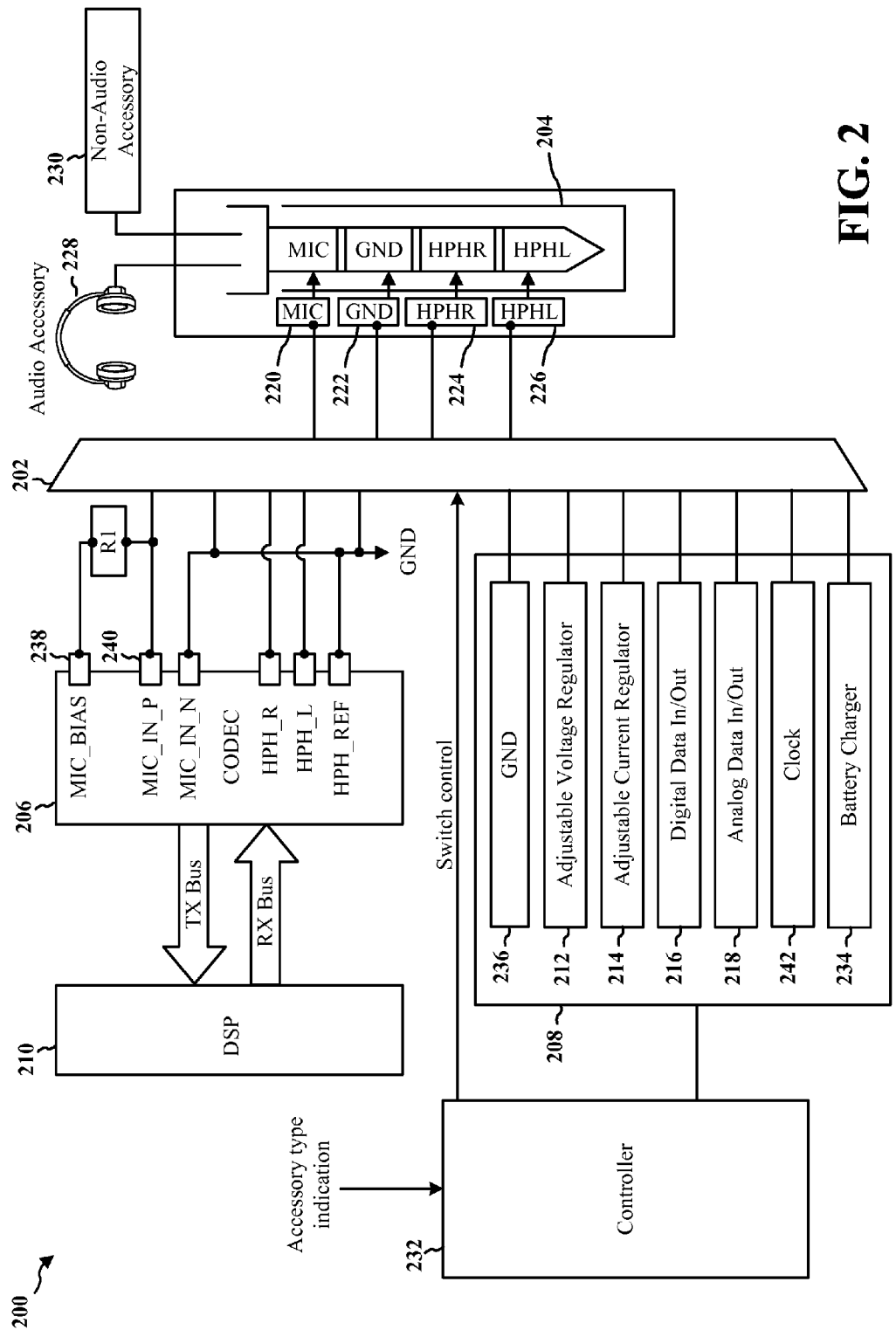
FIG. 2 is a schematic block diagram of a user device having a switchable interface between a headset jack and device components or circuitry.

FIG. 2 is a schematic block diagram of a user device 200 that includes a switchable interface or switching mechanism 202 between a headset jack 204 and an audio codec 206 and alternate circuitry 208. The audio codec 206 provides audio capture and playback for an audio accessory 228 connected to the headset jack 204. The codec 206 also interfaces with a DSP 210. The alternate circuitry 208 may include, but is not limited to, for example, one or more of an adjustable voltage regulator 212, an adjustable current regulator 214, a digital data in/out 216, an analog data in/out 218, a clock 242, a battery charger 234, and a ground 236. Depending on the type of accessory device, e.g., audio headphones 228, non-audio device 230, connected to the headset jack 204, the switchable interface 202 provides connection to the audio codec 206 or one or more of the alternate circuitries 208. A controller 232 receives an indication of the accessory type and outputs a switch control signal to control the switchable interface 202. The indication of the accessory type may come from the codec 206.

The switching mechanism 202, an audio codec 206, alternate circuitry 208 (including the voltage regulator 212, the current regulator 214, the digital data in/out 216, the analog data in/out 218, the clock 242, the battery charger 234) and the controller 232 may be referred to herein as modules. The modules may be software modules running in a processor, resident/stored on a computer readable medium, one or more of hardware modules coupled to a processor, or some combination thereof.

As previously described, the headset jack 204 has four pin connections that are normally connected to the audio codec 206. The microphone-in (MIC) pin 220 is an analog input to the codec 204 and functions to provide voice sampling. The ground (GND) pin 222 is common analog ground for input and output pins from the codec 204. The headphone-right (HPHR) pin 224 and the headphone-left (HPHL) pin 226 are analog outputs from the codec 204 and function to provide audio playback.

The switching mechanism 202 under control of the controller 232 allows for connection between the headset pins 220, 222, 224, 226 and one of the audio codec 206 and the alternate circuitry 208. In one configuration, the switchable interface 202 is a multiplexer. When connected to the audio codec 206, the headset jack connection pins may be connected to the audio codec as described above. When connected to alternate circuitry 208, the headset jack connection pins may be connected to one or more of the voltage regulator module 212, the current regulator module 214, the digital data in/out module 216, the analog data in/out module 218, the clock module 242, the battery charger module 234, and ground 236, depending on the connected accessory type and the requirements of the connected accessory.

For example, if the connected accessory type is a sensor accessory device, then the MIC pin 220 may be connected to either the digital data in/out 216 or the analog data in/out 218, the GND pin 222 is connected to the GND 236, the HPHR pin 224 is connected to the adjustable voltage regulator 212, and the HPHL pin 226 is connected to the adjustable current regulator 214. The adjustable voltage regulator 212 and the adjustable current regulator 214 can be merged and connected to one of the HPHR 224 or HPHL 226 pins. In yet another embodiment, two of the same types of the adjustable voltage regulator or the current regulator may be connected to HPHR 224 and HPHL 226 pins. Hence, flexible connection through switchable interface 202 is not limited to the above examples.

Figure 3:
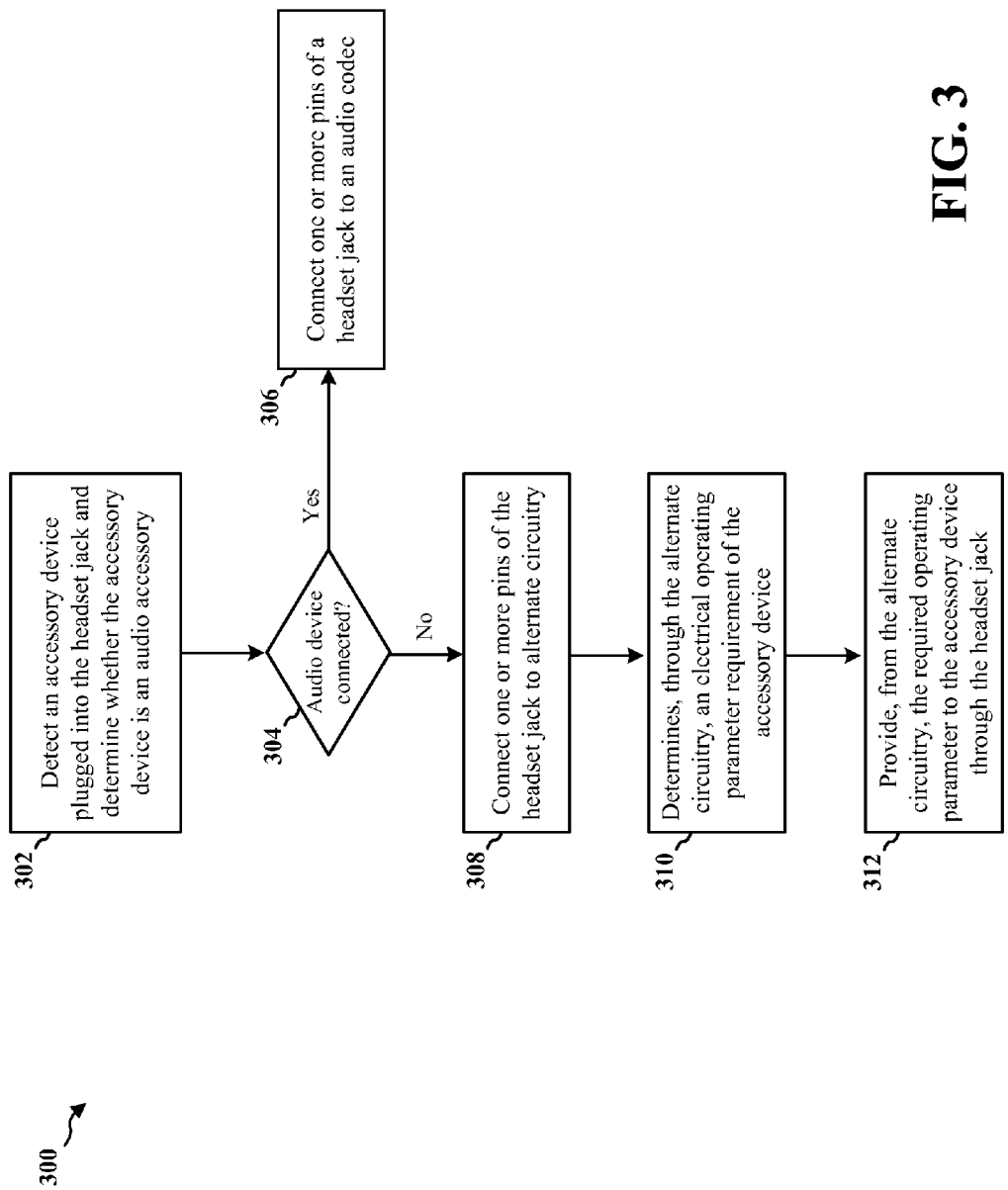
FIG. 3 is a flow chart of a method of operating a user device of FIG. 2 when an accessory is connected to the headset jack.

FIG. 3 is a flow chart 300 of a method of operation of a user device 200 of FIG. 2 when an accessory is connected to a headset jack of the user device. The method may be performed by the user device 200. At step 302, the user device detects that an accessory device 228, 230 is plugged into the headset jack 204 and determines whether the accessory device is an audio accessory or something other than an audio accessory, e.g., a sensor device, a financial data transaction device, etc. Detection of a plugged-in accessory device 228, 230 may be done using techniques known in the art. For example, the audio codec 206 may detect when an accessory has been plugged into the headset jack 204 based on the voltage level or current level change on MIC_BIAS terminal 238. The MIC_BIAS terminal 238 is floating when there is no device connected; hence there is no active current sourced to the MIC pin 220 in the jack 204. On the other hand, when a device is connected, the current is pulled through the MIC pin 220 to the external device. The difference in current level between these two situations is captured by detection circuits inside the audio codec 206. The audio codec 206 provides this status change to a preceding processor (not shown).

Continuing with step 302, upon detecting a plugged in accessory device 228, 230, the user device determines what type of device, e.g., audio or non-audio, is plugged in. To this end, the audio codec 206 may send a signal to the connected accessory 228, 230. In one implementation, the signal may be a current pulse sent through the MIC_BIAS 238 terminal or the MIC_IN_P terminal 240 of the audio codec 206. Normally, headsets or other audio accessories may be distinguished from non-audio accessories by detecting their impedance level across the HPHR pin 224 and the HPHL 226 pin, or between the HPHL pin 226 and the GND 236 pin. For example, in the case of audio headphones having a 32 ohm impedance, the audio codec 206 may send a current pulse through the HPHL pin 226 and measure the impedance across the HPHL pin 226 and the HPHR pin 224. If the impedance is something other than 32 ohms, the user device determines that the plugged-in accessory device 230 is something other than an audio headphone.

Below is a table of example pin connections between a multiplexer 202 input side interfacing with a codec 206 and output side interfacing with a headset jack 204 for impedance measurement purposes:

TABLE 1

| 202 Left-Side (In to Mux) Chip-side | 202 Right-Side (Out from Mux) Headset Jack side | State/Parameter |
| --- | --- | --- |
| MIC_IN_P | MIC | Current source or Pull-up switch may be connected. Internally, there may be a comparator to detect open circuit or something is shorted to GND with low impedance. Alternative to detection through HPHL or second option. |
| HPH_R | HPHR | All circuits internally in chip side power down or high-Z state |
| HPH_L | HPHL | Current source or Pull-up switch may be connected. Internally, there may be a comparator to detect open circuit or something is shorted to GND with low impedance. |
| GND | GND | Signal common ground. |

At step 304, if the connected accessory is determined to be an audio accessory device 228, the process proceeds to step 306 where the user device connects one or more pins 220, 222, 224, 226 of a headset jack of the user device to an audio codec 204. The pins 220, 222, 224, 226 may be normally connected to the audio codec 204 through a switching mechanism 202, such as a multiplexer. In this case, the user device connects the one or more pins 220, 222, 224, 226 to the audio codec 204 by maintaining the normally connected state of the pin-to-codec connections. The normally connected state of the pin-to-codec connections may be as described above with reference to FIG. 2. In one implementation, a controller 232 maintains the switching mechanism 202 in the normally connected state by providing a switch control signal corresponding to the normally connected state.

If at step 304, the connected accessory 230 is determined to be a non-audio accessory device, the process proceeds to step 308 where the user device connects one or more pins 220, 222, 224, 226 of the headset jack 204 to alternate circuitry 208 other than the audio codec 206. Connecting one or more pins 220, 222, 224, 226 of the headset jack 204 to alternate circuitry 208 may be done by switching connections of the one or more pins normally connected to the audio codec 206 to connections with the alternate circuitry. Such switching of connection may be made through the switching mechanism 202 based on switch control signals provided by the controller 232.

At this point, while the user device has determined that a non-audio accessory 230 is plugged into the headset jack 204, the user device may not yet know the type of non-audio accessory. Accordingly, the switching mechanism 202 may connect one or more of the headset jack pins 220, 222, 224, 226 to one or more of the digital data in/out module 216 and analog data in/out module 218 so the user device may communicate with the non-audio accessory device 230 to determine the accessory device type. For example, the user device, under control of the controller 232, may poll or handshake with the connected non-audio accessory device 230 through the digital data in/out module 216 until the user device determines the type of non-audio accessory that is connected. One exemplary embodiment is to communicate and decide what type of output is needed. Hence, during initial communication, the non-audio accessory 230 may provide one or more of the voltage level and the current level needed from the adjustable current regulator 214 and the adjustable voltage regulator 212. After necessary power levels are provided to the non-audio accessory 230, then, the accessory may continue communicating through the digital data in/out pin 216 in order to provide or receive real information corresponding to the type of non-audio accessory 230. This information may be (but not limited to) credit card payment, or data collected by environmental sensor, or it may be heartbeat rate of the user, or any other sensory information.

At step 310, upon connection between the headset jack pins 220, 222, 224, 226 and alternate circuitry 208, the user device determines, through the alternate circuitry, an electrical operating parameter requirement of the non-audio accessory device 230. For example, if the alternate circuitry 208 includes a digital data in/out module 216, the user device, under control of the controller 232, may determine an electrical operating parameter requirement of the non-audio accessory device 230 by sending a request for such information to the non-audio accessory device 230 over the digital data in/out module 216 and receiving information from the non-audio accessory device 230 corresponding to the operating parameter requirement through the digital data in/out module 216. The electrical operating parameter requirement may be for example, one of a required voltage supply, a required current supply, or a low power indication.

At step 312, the user device provides, from the alternate circuitry 208, the required operating parameter to the non-audio accessory device 230 through the headset jack 204. In the case of a required voltage, the controller 232 may adjust the programmable voltage regulator module 212 of the alternate circuitry 208 to output the required voltage through an appropriate pin of the headset jack 204. For example, in one configuration the voltage regulator module 212 may provide voltages from 0.1V to 3.7V or lower than high battery voltage of 4.2V. For example, in one configuration the voltage regulator module 212 may provide voltages in the range of 1.2V to an external biometric sensor.

In the case of a required current, the controller 232 may adjust programmable current regulator module 214 of the alternate circuitry to output the required current through an appropriate pin of the headset jack 204 varying from few hundreds of micro-amperes to high hundreds of milliamperes. For example, for various commercially available sensor types, the current regulator module 214 may provide: 1) for a fingerprint sensor, a normal current of 70 mA and a maximum current of 220 mA current; 2) a heart beat sensor, an operating current of 100 mA; 3) a gas sensor, a minimum current of 60 mA and a maximum current of 165 mA; 4) a smoke detector, a standby current of 70 μA and an alarm current of 60 mA.

Below is a table of example pin connections between a multiplexer 202 input side interfacing with auxiliary circuitry 208 and output side interfacing with a headset jack 204 for variable current supply purposes:

TABLE 2

| 202 Left-Side (In to Mux) Chip-side | 202 Right-Side (Out from Mux) Headset Jack side | State/Parameter |
|---|---|---|
| Adjustable Voltage or Current Regulator 212 or 214 (based on the need from external device) | MIC | Current source or Pull-up switch may be connected. Internally, there may be a comparator to detect open circuit or something is shorted to GND with low impedance. Alternative to detection through HPHL or second option. |
| Digital Data In/Out | HPHR | All circuits internally in chip side power down or high-Z state |
| CLK | HPHL | Current source or Pull-up switch may be connected. Internally, there may be a comparator to detect open circuit or something is shorted to GND with low impedance. |
| GND | GND | Signal common ground. |

If analog communication is preferred then multiple regulators (e.g., a voltage regulator and a current regulator) can be provided as follows:

TABLE 3

| 202 Left-Side (In to Mux) Chip-side | 202 Right-Side (Out from Mux) Headset Jack side | State/Parameter |
|---|---|---|
| Adjustable Current or Voltage Regulator 212 or 214 (based on the need from external device) | MIC | Current source or Pull-up switch may be connected. Internally, there may be a comparator to detect open circuit or something is shorted to GND with low impedance. Alternative to detection through HPHL or second option. |
| Analog Data In/Out | HPHR | All circuits internally in chip side power down or high-Z state |
| Adjustable Current or Voltage Regulator 212 or 214 (based on the need from external device) | HPHL | Current source or Pull-up switch may be connected. Internally, there may be a comparator to detect open circuit or something is shorted to GND with low impedance. |
| GND | GND | Signal common ground. |

In the case of a low power indication from the non-audio accessory device 230, the controller 232 may control the switching mechanism 202 to connect the battery charger 234 to appropriate pins of the headset jack 204 to thereby provide connections for purposes of charging the non-audio accessory. The battery charger 234 provides an interface between charging components, e.g. battery, of the non-audio accessory 230 and a charging source associated with the user device. In one implementation, the battery charger 234 may connect the charging components of the non-audio accessory 230 to the user device 200 battery (not shown), in which case the non-audio accessory is charged by the device battery. In another implementation, the battery charger 234 may connect the charging components of the non-audio accessory 230 to the charging port (not shown) of the user device 200, in which case the non-audio accessory may be charged by an external battery charging source, e.g., electrical outlet, connected to the charging port of the user device.

In the case of a low power indication from the user device 200 itself, the controller 232 may control the switching mechanism 202 to connect the battery charger 234 to appropriate pins of the headset jack 204 to thereby provide connections for purposes of charging the user device 200. The battery charger 234 provides an interface between the battery of the user device 200 and a charging source associated with the non-audio accessory 230. In one implementation, the battery charger 234 may connect the battery of the user device 200 to the non-audio accessory 230 battery (not shown), in which case the user device 200 is charged by the non-audio accessory 230 battery. In another implementation, the battery charger 234 may connect the battery of the user device to the charging port (not shown) of the non-audio accessory 230, in which case the user device may be charged by an external battery charging source, e.g., electrical outlet, through the non-audio accessory.

Below is a table of example pin connections between a multiplexer 202 input side interfacing with a auxiliary circuitry 208 and output side interfacing with a headset jack 204 for battery charging purposes:

TABLE 4

| 202 Left-Side (In to Mux) Chip-side | 202 Right-Side (Out from Mux) Headset Jack side | State/Parameter |
|---|---|---|
| No Connect or Battery Charger 234 (if additional port is needed) | MIC | Current source or Pull-up switch may be connected. Internally, there may be a comparator to detect open circuit or something is shorted to GND with low impedance. Alternative to detection through HPHL or second option. |
| Digital or Analog Data In/Out | HPHR | All circuits internally in chip side power down or high-Z state |
| Battery Charger 234 | HPHL | Current source or Pull-up switch may be connected. Internally, there may be a comparator to detect open circuit or something is shorted to GND with low impedance. |
| GND | GND | Signal common ground. |

With reference to FIG. 2, in some configurations, an audio accessory 228 may include one or more non-audio components. For example, a headset may include a sensor component, e.g., heart rate monitor. In the case of an integrated audio/non-audio accessory, the user device may connect one or more pins of the headset jack 204 to alternate circuitry 208 other than the audio codec 208 during operation of the non-audio component of the audio accessory. In this configuration, the user device may measure a load of the non-audio component of the audio accessory through the audio codec 206, or receive a request from the non-audio component for an electrical parameter through the audio codec. In response, the user device may switch one or more headset connections away from the audio codec 208 to the auxiliary circuitry 208 to facilitate operation of the non-audio component. The foregoing may also apply to a non-audio accessory 230 having an audio component. In either case, the user device may dynamically switch back and forth between connections as needed based on the requirements of the audio and non-audio functionality of the integrated accessory device.

In the foregoing description, the type of, and operating requirements of, non-audio devices is determined through communication between the non-audio device and the user device. In other configurations, the type and operating requirements may be mapped to impedance measurements and stored in user device memory. In this embodiment, if the impedance measured as part of step 302 does not correspond to an audio headset, the measured impedance may be compared to a look-up table that includes impedance measurements and corresponding operating parameters. For example, the look up table may include an entry for an impedance measurement in the range of 100 ohms to 200 ohms that corresponds to a heart beat sensor that requires 100 mA of operating current.

Figure 4:
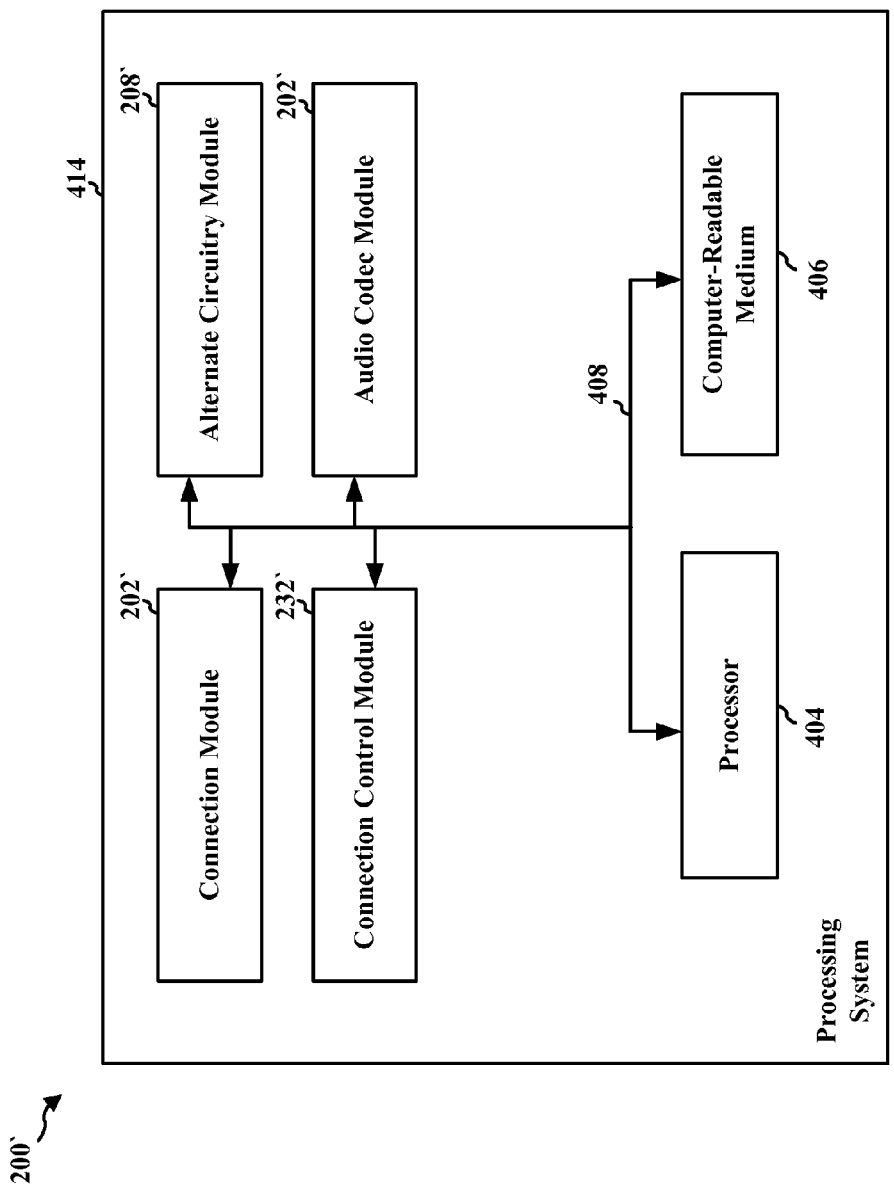
FIG. 4 is a diagram illustrating a hardware implementation for a user device employing a processing system to implement the method of FIG. 3.

FIG. 4 is a diagram illustrating an example of a hardware implementation for a user device 200' employing a processing system 414. The processing system 414 may be implemented with a bus architecture, represented generally by the bus 408. The bus 408 may include any number of interconnecting buses and bridges depending on the specific application of the processing system 414 and the overall design constraints. The bus 408 links together various circuits including one or more processors and/or hardware modules, represented by the processor 404, the connection/switch module 202', the connection/switch control module 232', the alternate circuitry module 208', the audio codec module 202', and the computer-readable medium 406. The bus 408 may also link various other circuits such as timing sources, peripherals, voltage regulators, and power management circuits, which are well known in the art, and therefore, will not be described any further.

With reference to FIG. 2, the connection/switch module 202' may correspond to a switching mechanism 202 and may be, for example, a multiplexer. The connection/switch control module 232' may correspond to a controller 232 that is configured to receive inputs, e.g., accessory type indication, from other user device components, to output switch control signals to the switching mechanism 202 based on the received input, to communicate (e.g., poll and handshake) with non-audio accessory devices 230 through appropriate alternate circuitry 208, and to control/adjust appropriate alternate circuitry based on communication outcome.

With continued reference to FIG. 2, the alternate circuitry module 208' may correspond to the alternate circuitry 208, including, for example, one or more of an adjustable voltage regulator 212, an adjustable current regulator 214, a digital data in/out 216, an analog data in/out 218, a clock 242, a battery charger 234, and a ground 236. The audio codec module 202' may correspond to the audio codec 206.

The processing system 414 includes a processor 404 coupled to a computer-readable medium 406. The processor 404 is responsible for general processing, including the execution of software stored on the computer-readable medium 406. The software, when executed by the processor 404, causes the processing system 414 to perform the various functions described supra for any particular apparatus. The computer-readable medium 406 may also be used for storing data that is manipulated by the processor 404 when executing software. The processing system further includes at least one of the connection/switch module 202, the connection/switch control module 232, the alternate circuitry module 208, the audio codec module 202. The modules may be software modules running in the processor 404, resident/stored in the computer readable medium 406, one or more hardware modules coupled to the processor 404, or some combination thereof.

In one configuration, the user device 200, 200' includes means for connecting one or more pins of a headset jack of the user device to an audio codec when an accessory device plugged into the headset jack is an audio accessory device, means for connecting one or more pins of the headset jack to alternate circuitry other than the audio codec when the accessory device plugged into the headset jack is not an audio accessory device, means for determining, through the alternate circuitry, an electrical operating parameter requirement of the accessory device, and means for providing, from the alternate circuitry, the required operating parameter to the accessory device through the headset jack.

The aforementioned means may be one or more of the aforementioned modules of the apparatus 200 and/or the processing system 414 of the apparatus 200' configured to perform the functions recited by the aforementioned means. For example, the means for connecting one or more pins of a headset jack of the user device to an audio codec when an accessory device plugged into the headset jack is an audio accessory device, may include one or more of a controller 232 and a switching mechanism 202 configured to operate as described above, when an audio accessory device 228 is connected to a headset jack 204.

The means for connecting one or more pins of the headset jack to alternate circuitry other than the audio codec when the accessory device plugged into the headset jack is not an audio accessory device, may include one or more of a controller 232 and a switching mechanism 202 configured to operate as described above, when a non-audio accessory device 230 is connected to a headset jack 204.

The means for determining, through the alternate circuitry, an electrical operating parameter requirement of the accessory device, may include one or more of a controller 232 and alternate circuitry 208, such as a digital data in/out module 216 and an analog data in/out module 218, configured to communicate with the non-audio accessory 230 to determine one or more of the type of non-audio accessory device and an operating parameter requirement of the non-audio accessory device. The means for providing, from the alternate circuitry, the required operating parameter to the accessory device through the headset jack, may include a controller 232 and alternate circuitry 208, such as a voltage regulator module 212 and/or a current regulator module 214, wherein the controller is configured to adjust the appropriate alternate circuitry to provide the required operating parameter.

In summary, an apparatus, e.g., a user device, determines whether a device connected to its headset jack is an audio accessory device. If the device plugged into the headset jack is an audio accessory, the user device connects one or more pins of the headset jack to an audio codec. If the device connected to the headset jack is not an audio accessory device, the user device connects one or more pins of the headset jack to alternate circuitry. The user device then determines, through the alternate circuitry, an electrical operating parameter requirement of the accessory device, and provides, from the alternate circuitry, the required operating parameter to the accessory device through the headset jack. The alternate circuitry may include an adjustable voltage regulator and/or an adjustable current regulator and the required operating parameter may be one or more of a voltage supply and a current supply.

In one configuration, the foregoing may be embodied as a circuit in a mobile device. The circuit may include a multiplexer interfaced with a headset jack, programmable voltage and/or current regulators to provide adjustable current or voltage coupled to the multiplexer interface, and input/output communication blocks coupled to multiplexer interface to provide analog or digital serial communication interface for data communication in addition to adjusted voltage/current regulator levels.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a wireless user device, comprising:
    connecting one or more pins of a headset jack of the wireless user device to an audio coder-decoder (codec) when an accessory device plugged into the headset jack is an audio accessory device;
    connecting the one or more pins of the headset jack to an alternate circuitry other than the audio codec when the accessory device plugged into the headset jack is a non-audio accessory device;
        determining, through the alternate circuitry, a required electrical operating parameter of the accessory device; and
    providing, from the alternate circuitry, the required electrical operating parameter to the accessory device through the headset jack, wherein the required electrical operating parameter is at least one of a required voltage supply or a required current supply.

2. The method of claim 1, further comprising detecting the accessory device plugged into the headset jack.

3. The method of claim 1, wherein connecting the one or more pins of the headset jack to the alternate circuitry comprises switching one or more connections of the one or more pins connected to the audio codec to one or more connections with the alternate circuitry.

4. The method of claim 1, wherein the alternate circuitry comprises a data in/out line, and determining the electrical operating parameter of the accessory device comprises receiving information over the data in/out line from the accessory device corresponding to the electrical operating parameter requirement.

5. The method of claim 4, wherein the electrical operating parameter requirement comprises one of a required voltage and a required current.

6. The method of claim 4, wherein the electrical operating parameter requirement comprises an indication of a low charge level of a battery of the accessory device and providing the required electrical operating parameter to the accessory device through the headset jack comprises providing a source for charging the battery through the headset jack, the source corresponding to one or more of a battery of the user device or a charging port of the user device.

7. The method of claim 1, wherein providing the required electrical operating parameter to the accessory device through the headset jack comprises one or more of:
    adjusting a programmable voltage regulator to output the required voltage supply; or
    adjusting a programmable current regulator to output the required current supply.

8. The method of claim 1, further comprising:
    receiving an indication of a low charge level of a battery of the wireless user device; and
    providing a source for charging the battery through the headset jack, the source corresponding to one or more of a battery of the accessory device or a charging port of the accessory device.

9. The method of claim 1, wherein the audio accessory device comprising the non-audio accessory device further comprises a non-audio component, and wherein the one or more pins of the headset jack are connected to the alternate circuitry other than the audio codec during operation of the non-audio component.

10. The method of claim 1, wherein connecting one or more pins of the headset jack to the alternate circuitry comprises determining whether the accessory device is the audio accessory device.

11. A wireless user device, comprising:
    a memory; and
    at least one processor coupled to the memory and configured to:
        connect one or more pins of a headset jack of the wireless user device to an audio coder-decoder (codec) when an accessory device plugged into the headset jack is an audio accessory device;
        connect the one or more pins of the headset jack to an alternate circuitry other than the audio codec when the accessory device plugged into the headset jack is a non-audio accessory device;
        determine, through the alternate circuitry, a required electrical operating parameter of the accessory device; and
        provide, from the alternate circuitry, the required electrical operating parameter to the accessory device through the headset jack, wherein the required electrical operating parameter is at least one of a required voltage supply or a required current supply.

12. The device of claim 11, wherein the at least one processor is further configured to detect the accessory device plugged into the headset jack.

13. The device of claim 11, wherein to connect the one or more pins of the headset jack to the alternate circuitry, the at least one processor is further configured to switch one or more connections of the one or more pins connected to the audio codec to one or more connections with the alternate circuitry.

14. The device of claim 11, wherein the alternate circuitry comprises a data communication in line and a data communication out line, and to determine the electrical operating parameter of the accessory device, the at least one processor is further configured to receive information from the accessory device corresponding to the electrical operating parameter requirement.

15. The device of claim 14, wherein the electrical operating parameter requirement comprises one of a required voltage and a required current.

16. The device of claim 15, wherein the electrical operating parameter requirement comprises an indication of a low charge level of a battery of the accessory device and the at least one processor provides the required electrical operating parameter to the accessory device through the headset jack by being configured to provide a source for charging the battery through the headset jack, the source corresponding to one or more of a battery of the user device or a charging port of the user device.

17. The device of claim 11, wherein the at least one processor provides the required electrical operating parameter to the accessory device through the headset jack by being configured to:
adjust a programmable voltage regulator to output the required voltage supply, or
adjust a programmable current regulator to output the required current supply.

18. The device of claim 11, wherein the at least one processor is configured to:
receive an indication of the low charge level of a battery of the wireless user device; and
provide a source for charging the battery through the headset jack, the source corresponding to one or more of a battery of the accessory device or a charging port of the accessory device.

19. The device of claim 11, wherein the audio accessory device comprising the non-audio accessory device further comprises a non-audio component, and wherein the one or more pins of the headset jack are connected to the alternate circuitry other than the audio codec during operation of the non-audio component.

20. The device of claim 11, wherein the at least one processor connects one or more pins of the headset jack to the alternate circuitry by being configured to determine whether the accessory device is the audio accessory device.

21. A wireless user device, comprising:
means for connecting one or more pins of a headset jack of the wireless user device to an audio coder-decoder (codec) when an accessory device plugged into the headset jack is an audio accessory device;
means for connecting the one or more pins of the headset jack to an alternate circuitry other than the audio codec when the accessory device plugged into the headset jack is a non-audio accessory device;
means for determining, through the alternate circuitry, a required electrical operating parameter of the accessory device; and
means for providing, from the alternate circuitry, the required electrical operating parameter to the accessory device through the headset jack, wherein the required electrical operating parameter is at least one of a required voltage supply or a required current supply.

22. The device of claim 21, further comprising means for detecting the accessory device plugged into the headset jack.

23. The device of claim 21, wherein the alternate circuitry comprises a data in/out line, and the means for determining the electrical operating parameter of the accessory device is configured to receive information over the data in/out line from the accessory device corresponding to the electrical operating parameter requirement.

24. The device of claim 23, wherein the electrical operating parameter requirement comprises one of a required voltage and a required current.

25. The device of claim 21, wherein the means for providing the electrical operating parameter to the accessory device through the headset jack is configured to:
adjust a programmable voltage regulator to output the required voltage supply, or
adjust a programmable current regulator to output the required current supply.

26. A non-transitory computer-readable medium storing computer-executable code, comprising code for:
connecting one or more pins of a headset jack of a wireless user device to an audio coder-decoder (codec) when an accessory device plugged into the headset jack is an audio accessory device;
connecting the one or more pins of the headset jack to an alternate circuitry other than the audio codec when the accessory device plugged into the headset jack is a non-audio accessory device;
determining, through the alternate circuitry, a required electrical operating parameter of the accessory device; and
providing, from the alternate circuitry, the required electrical operating parameter to the accessory device through the headset jack, wherein the required electrical operating parameter is at least one of a required voltage supply or a required current supply.

27. The non-transitory computer-readable medium of claim 26, further comprising code for detecting the accessory device plugged into the headset jack.

28. The non-transitory computer-readable medium of claim 26, wherein the code for connecting the one or more pins of the headset jack to the alternate circuitry comprises code for switching one or more connections of the one or more pins connected to the audio codec to one or more connections with the alternate circuitry.

29. The non-transitory computer-readable medium of claim 26, wherein the code for connecting the one or more pins of the headset jack to the alternate circuitry comprises code for determining whether the accessory device comprises the audio accessory device.

30. The non-transitory computer-readable medium of claim 26, wherein the alternate circuitry comprises a data communication in line and a data communication out line, and the code for determining the electrical operating parameter of the accessory device comprises code for receiving information from the accessory device corresponding to the electrical operating parameter requirement.

* * * * *